UNITED STATES PATENT OFFICE.

CLARENCE S. DIKEMAN, OF NEW YORK, N. Y.

IMPROVED COMPOSITION FOR TREATING VEGETABLE PAPER.

Specification forming part of Letters Patent No. 36,704, dated October 21, 1862.

*To all whom it may concern:*

Be it known that I, CLARENCE S. DIKEMAN, of the city, county, and State of New York, have invented a new and Improved Composition for Vegetable Paper; and I do hereby declare that the following is a description of the same.

The object of this invention is to prepare that kind of paper known as "vegetable paper," and generally used for covering artificial flowers put up in suitable boxes.

The invention consists in the employment for the purpose of preparing said vegetable paper of a composition or mixture of kerosene-oil and spirits of turpentine, to be applied to the paper by means of a sponge or in any other convenient manner.

To enable those skilled in the art to make and use my invention, I will proceed to describe it.

The proportion in which I mix the ingredients of my composition together is about as follows: kerosene-oil, two parts; spirits of turpentine, one part. After these ingredients have been intimately mixed the composition is ready to be applied to the paper.

The application of the mixture to the paper may be accomplished in various ways and by various means; but I use by preference a sponge, and after having spread the sheet of paper on a flat surface—such as a table—I dip the sponge in the composition and rub it on the surface of the paper until the latter is completely saturated. The paper is then hung up to dry for a period of from ten to twenty hours, and it is fit for use.

The peculiar advantage of my composition is that paper prepared with it is not liable to turn yellow, and when used for covering artificial flowers put up in boxes it preserves its original freshness for a long time. The paper now in general use in the United States for this purpose is imported from France, and the composition applied to said paper has hitherto been kept secret; neither have I been able to find out the ingredients nor the exact proportion of said composition. Experience shows, however, that said paper after having been used for a short time will turn yellow and assume an oldish look, and if the box is opened and presented to a customer this oldish yellow look of the covering-paper tends to convey the idea that the contents of the box are also old. This difficulty is obviated by the use of my composition, whereby a paper can be produced not liable to turn yellow in several years.

Having thus fully described my invention, what I claim as new, and desire to secure by Letters Patent, is—

The employment or use for the purpose of preparing vegetable paper of a composition made of the ingredients herein specified and mixed together in about the proportion and substantially in the manner described.

CLARENCE S. DIKEMAN.

Witnesses:
JAMES LAIRD,
R. GAWLEY.